United States Patent [19]
Stirton

[11] 3,777,586
[45] Dec. 11, 1973

[54] LOCKING BELT
[76] Inventor: Alfred L. Stirton, P.O. Box 1181, Susanville, Calif. 96130
[22] Filed: May 13, 1971
[21] Appl. No.: 143,101

[52] U.S. Cl. ............................................. 74/231 J
[51] Int. Cl. ............................................. F16g 1/00
[58] Field of Search ............... 24/31 R, 31 B, 31 C, 24/31 F, 36; 29/237, 238, 243, 268, 278, 525; 63/11; 74/231 R, 231 J, 236, 237, 242, 258; 254/52; 285/23; 237/20.92 A, 20.92 B; 339/221

[56] References Cited
UNITED STATES PATENTS
| | | | |
|---|---|---|---|
| 1,615,008 | 1/1927 | Ferguson | 29/525 |
| 328,862 | 10/1885 | Robinson | 254/52 |
| 796,688 | 8/1905 | Witty | 287/20.92 B |
| 2,038,469 | 4/1936 | Bannister | 74/237 |
| 3,627,362 | 12/1971 | Brenneman | 287/20.92 B |

FOREIGN PATENTS OR APPLICATIONS
712,116  7/1954  Great Britain ....................... 74/231

Primary Examiner—Leonard H. Gerin

[57] ABSTRACT

A belt for automobiles, machinery, belt-driven tools, implements and items that have use for pulley driven belts, and the like.

This belt includes a toothed and pronged male member which will be inserted into a hollow toothed female so as to effectively secure the ends together in order to form a continuous belt. More than one length of belt can be inserted into each other to form any desired length needed.

5 Claims, 4 Drawing Figures

PATENTED DEC 11 1973　3,777,586

LOCKING BELT

This invention relates to a continuous locking belt for autos, machinery or any item that uses a continuous belt system.

It is therefore the primary purpose of this invention to provide a locking belt which will have one end with a male member which is insertable into a hollow female member at the other end of the belt. The arrangement forming a permanent endless belt.

Another object of this invention is to provide a locking belt in which the male member will include a pair of toothed prongs. The prongs being stamped, formed or otherwise made of one piece. The prongs when forced together by entering the hollow toothed female member at the opposite end of the belt, the teeth serve as barb-like means for preventing the ends of the belt from separating.

Another object of this invention is to provide a locking belt in which the male and female portions may be inserted together easily. The belt being adaptable to vehicles and machinery wherein the area to where the belt is applied necessitates the removal of many parts to reinstall a belt.

A further object of this invention is to provide a belt of the type described which may be installed in a minimum amount of time by even the novice and the male and female portions of the belt will have hinged portions imbedded therein so as to conform with the peripheral shapes of the pulleys the belt is to be applied to.

The hinged portions imbedded in the belt also add to the strength by the length of imbedment within the belt and still retain flexibility and tension due to the latch-type hinge to conform to pulley diameters.

Yet another object of this invention is to provide a belt which will have the male and female members of a spring-like type metal or material so as to endure teh bending stresses while yet being tough enough to have great endurance in use and the ends of the belt will be additionally rendered secure by means of a rubber-type cement.

Other objects of the present invention are to provide a locking belt which is simple in design, inexpensive to manufacture, rugged in construction, easy to apply and efficient in operation.

These and other objects will become readily evident upon a study of the following specification together with the accompanying drawing wherein.

Figure 1:
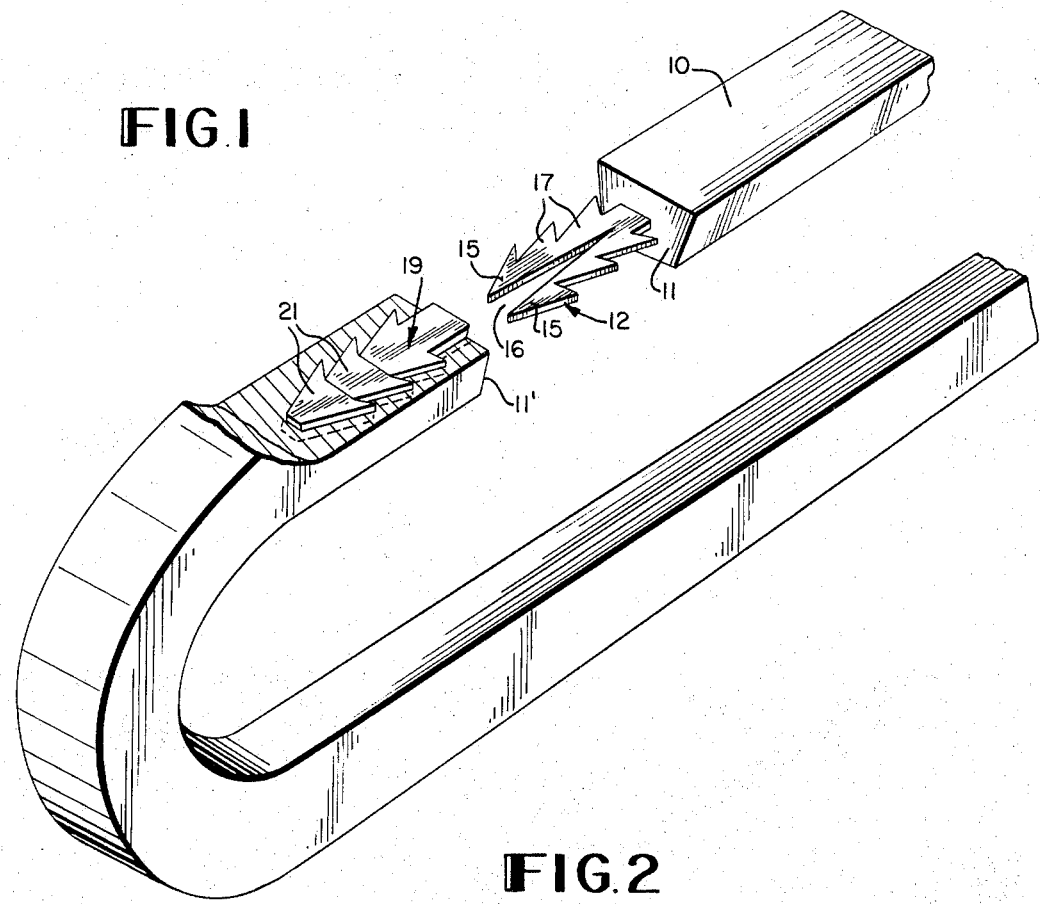
FIG. 1 is a fragmentary perspective view of the present invention shown partly broken away with the ends separated.
Figure 2:
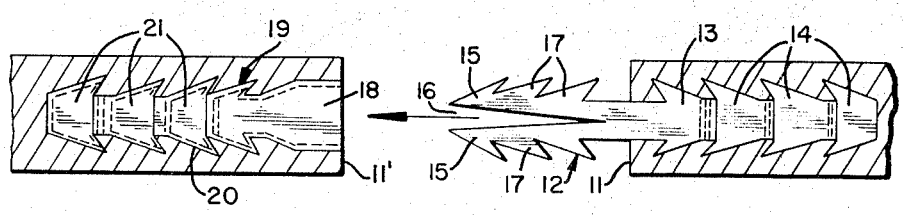
FIG. 2 is a fragmentary plan view of the separated ends shown in section.
Figure 3:
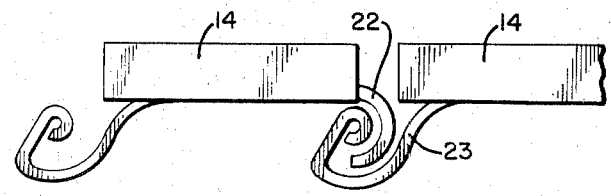

FIG. 3 is a fragmentary side view of the solid teeth 14 and hinged portion of FIG. 2 of the righthand side shown in elevation with male and female hinge members of FIG. 2. At the end of the specifications include the following: after 21, male hinge portions 22, female hinge portion 23, and solid and hinged teeth 14.

Figure 4:
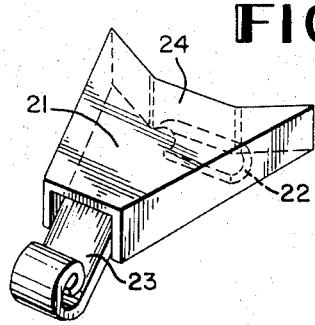

FIG. 4 shows at an angle of one of the hollow female teeth 21 of the lefthand side of FIG. 2 together with its female hinge portion 23, its male hinge portion 22 in phantom lines below the opening 24 for the male prongs 12 to be inserted.

According to this invention, a locking belt 10 is shown to have extended from one end 11, a male strip 12 having a plurality of oppositely opposed teeth 13 and hinged teeth 14 which are imbedded within end 11. Extending from end 11 are a pair of prongs 15 which are defined by openings 16 therebetween. Prongs 15 are provided with teeth 17 which are to be entered into the opening 18 of a female strip 19 which is imbedded within the end 11 of belt 10. The female strip 19 meets oppositely opposed teeth 20 which are hollow and will engage teeth 17 of prongs 15. The strip 19 also includes hinged hollow teeth 21.

What I claim is:

1. A locking belt for automobiles, machinery and the like, comprising a tooth male member strip with prongs for being forcibly entered into a hollow female member, a plurality of hollow hinged teeth carried by said female member, a plurality of solid hinged teeth carried by said male strip for flexability when said belt is on said pulleys.

2. The combination according to claim 1, wherein, one end of said belt to be joined to the opposite end is provided with said male strip having a plurality of teeth extending outwardly from its prong ends for engagement with hollow teeth of said female strip.

3. The combination according to claim 1, wherein, the pronged end of said male strip includes a triangular space defined by said prongs, which enables said prongs to be forced together when entering said female strip said prongs will expand so that said teeth of male strip will matingly engage with the peripheral shape of the hollow teeth of said female strip thus preventing said ends of belt from being separated.

4. The combination according to claim 1, wherein male and female hinged teeth are imbedded within belt and female hollow teeth are open at each end to accept flexible male prongs.

5. The combination according to claim 4, wherein imbedded teeth are provided with a male and female hinge connection.

* * * * *